United States Patent Office 3,002,181
Patented Sept. 26, 1961

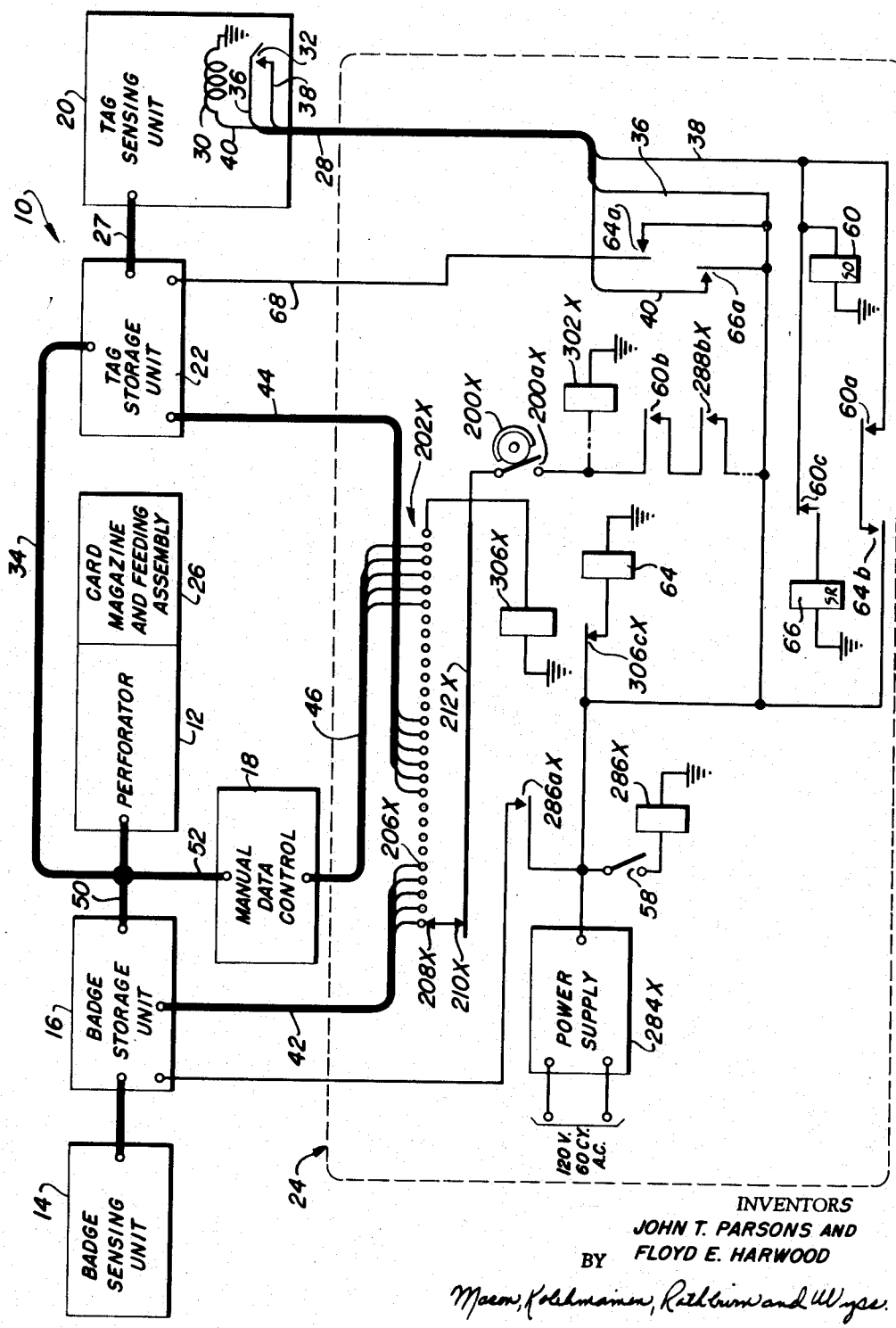

3,002,181
AUTOMATIC INVENTORY RECORDER
John T. Parsons, Traverse City, and Floyd E. Harwood, Ypsilanti, Mich., assignors to Parsons Corporation, Traverse City, Mich., a corporation of Michigan
Filed Jan. 10, 1958, Ser. No. 708,141
3 Claims. (Cl. 340—173)

This invention relates to an automatically operated unit for producing inventory records and, more particularly, to a new and improved apparatus controlled by a portable tag sensing unit for producing permanent records of fixed and variable items of information relating to an inventory.

Most business establishments take periodic inventories to provide an accurate record of the merchandise on hand. These inventories generally involve the manual recording of the price and cost of each article and of some designation identifying the article. In some inventories, the necessary information may also include the department or division in which the article is located and a designation identifying the person or persons taking the inventory. Most present methods require the presence of at least two people for determining the desired data and for manually recording this data. These operations are tedious and time consuming and, therefore, may be quite costly both from the viewpoint of the labor cost involved and the necessity of discontinuing normal business operations during the period in which the inventory is taken.

One method of reducing the cost of and the time normally expended in taking inventory is to provide each of the articles with a price tag bearing sensible indicia, such as perforations, which represent the items of information that are to be recorded. Thus, when the inventory is to be taken, the tag can easily be sensed and the sensed data can be automatically recorded without the need for visually determining and manually recording the necessary article cost and designation information.

Accordingly, one object of the present invention is to provide a new and improved inventory unit including recording means controlled by data derived from tags bearing sensible indicia for providing permanent records of data pertaining to the article.

Another object is to provide an inventory unit including data storing and recording means controlled by a remote sensing unit which derives data to be recorded from tags bearing sensible indicia.

Another object is to provide an inventory unit for automatically recording fixed data items on a record medium in conjunction with variable data items derived from a remote portable unit for sensing perforated tags.

In accordance with these and many other objects, an embodiment of the present invention comprises a data recording assembly with which are associated a plurality of separate data storing means and a means for sequentially feeding cards to the recording assembly. A first one of the data storing means is preferably provided for storing fixed items of information which are common to a plurality of separate inventory records, such as the department which the inventory is being taken, a designation or badge number identifying the party or parties taking the inventory, and the date and time of taking the inventory. This first data storing means may be provided by a group of adjustable selector switches which are set to positions representing the designation of the department or the date, or may comprise a group of storage relays which are connected to a sensing unit which is adapted to receive a badge or key having sensible indicia thereon representing the designation of the person taking the inventory.

A second data storing means or register is provided for storing variable items of information which are individual to each of the articles to be included in the inventory. This second data storing means preferably includes a plurality of register relays which are selectively operated under the control of a remote portable sensing unit. This sensing unit is adapted to receive a perforated tag bearing indicia representing the cost and designation of the article. Thus, when an inventory is taken, the portable tag sensing unit can be easily moved from one article to the next and the tag on each of the articles inserted into the sensing unit to provide the remote recording and data storing means with the necessary information.

In operation, the recording and data storing assemblies, which preferably comprise a unit mounted on a wheeled base, are moved to the area in which the inventory is to be taken and the fixed items of information pertaining to this area or department are stored in the first data storing means by either adjusting switching means to data representing settings or by inserting an indicia bearing record into a sensing means connected to the first data storing means. Thereafter, the portable tag sensing unit is moved from article to article and the tags affixed to the articles or to containers for the articles, are successively inserted into the remote portable tag sensing unit. In response to each insertion of a tag into the sensing unit, the second data storage means is operated to store the variable items of information. When the variable items of information have been stored in the second data storing means, a switching means, preferably in the form of a commutator, is rendered effective to sequentially interconnect the recorder with the first and second data storing means so that the fixed and variable items of information are recorded on a record medium, such as a punched card. In response to the completion of the cycle of operation of the switching means or commutator, the punched card is ejected, a blank card is fed into the recording assembly, and the second data storing means only is cleared or restored to a normal condition in which it is capable of receiving the items of information pertaining to the next sensed tag. The first data storing means is not cleared until such time as the items of information common to a plurality of inventoried articles are to be changed.

Many other objects and advantages of the present invention will become apparent from a consideration of the following detailed description of an illustrative embodiment of the invention which is shown in schematic form in the circuit diagram formng the single sheet of drawings.

Referring now to the drawing, an automatically operated inventory recording unit 10 embodying the present invention includes a perforator or recording assembly 12 for punching or otherwise recording, in sensible form, the items of information pertaining to the articles to be inventoried. To provide a first fixed item of information for recording on a card representing the identification or designation of the person or persons taking the inventory, a badge sensing unit 14 is provided for removably receiving a key or badge having sensible indicia thereon representing the indentification of the parties. The insertion of a badge or key into this sensing unit 14 selectively operates a badge storage unit 16 to store one or more digits representing the designation on the sensed badge. To provide a second fixed item of information common to a plurality of inventoried articles, a manual data control unit 18 is provided which preferably comprises a plurality of adjustable switches which are set to digit representing positions in accordance with such common or fixed items of information as the numerical designation of the department and the date on which the inventory is taken.

To provide the perforator or recording assembly 12 with variable items of information in accordance with the articles to be inventoried, a tag sensing unit 20 is provided which is operated by the insertion of a perforated tag to store the variable items of information, such as the cost and the designation of the article, in a tag storage unit 22. The components 12, 14, 16, 18 and 22 are preferably mounted on a wheeled base to permit the data and recording elements to be easily moved to different areas. The tag sensing unit 20 is preferably connected to the remaining components of the inventory recording unit 10 by a flexible cable so that the tag sensing unit 20 is easily moved to each of the articles to be inventoried to permit the insertion of the indicia bearing tags without removing the tags from the articles.

A control circuit 24, which is also mounted on the wheeled base or frame, is provided for operating the perforator 12 under the control of the various items of fixed and variable information. When the inventory control unit 10 is to be placed in operation, a badge is inserted into the sensing unit 14 to operate the badge storage unit 16 to store a numerical designation representing the party or parties taking the inventory, and the switches forming the manual data control 18 are set to provide the fixed items of information which are to be recorded by the perforator 12 representing the department in which and the date on which the inventory is taken. Thereafter, when a tag affixed to an article to be inventoried is inserted into the tag sensing unit 20, the control circuit 24 operates the tag sensing unit 20 to sense the inserted tag and to selectively operate the tag storage unit 22 to store the variable items of information, such as the cost and the designation of the article. In response to the storage of this information in the unit 22, the control circuit 24 successively connects the badge storage unit 16, the manual data control unit 18, and the tag storage unit 22 to the perforator 12 so that the items of information stored therein are recorded on a blank record card. At the completion of the recording of this information, the tag storage unit 22 is cleared or restored to a normal condition, the tag sensing unit 20 is released, the punched card is ejected from the perforator 12, and a card magazine and feeding assembly 26 is actuated to feed a blank card into the perforator 12. This cycle of operation is repeated each time a perforated tag is inserted into the sensing unit 20. Obviously, the fixed items of information stored in the units 16 and 18 can be adjusted or varied whenever necessary.

Referring now more specifically to the perforator 12 and the card magazine and feeding assembly 26, these components may be of any of the types well known in the art, but preferably are of the type disclosed in the copending application of Floyd E. Harwood, Serial No. 674,124, filed July 25, 1957, which copending application is assigned to the same assignee as the present application. As disclosed therein, the perforator or recorder assembly 12 comprises ten movably mounted punch elements which are selectively rendered effective to punch a record card in ten transversely spaced positions under the control of ten interposer solenoids. The perforator 12 includes a step-by-step or index feeding mechanism for advancing a record card a single step following each operation of the punching mechanism, a first card feeding mechanism for feeding a card supplied from the card magazine and feeding assembly 26 to a punching position, and an ejecting drive assembly for ejecting a punched card at the completion of the recording operation.

Referring now to the badge sensing unit 14 and the badge storage unit 16, these components perform the functions of sensing the badge indicia and of storing the reproduced information in usable form. Thus, these components may be of any of the types well known in the art, although they preferably are of the type shown and described in detail in the above identified copending Harwood application or in the copending application of John T. Parsons and Floyd E. Harwood, Serial No. 674,131, filed July 25, 1957, which latter application is also assigned to the same assignee as the present application. As shown therein, the badge sensing unit 14 includes a plurality of movable sensing pins which, upon operation, are moved toward a receptacle for removably receiving a perforated badge or key. Certain of the sensing pins pass through perforations in the inserted badge to close contacts for selectively operating different permutations of storage relays in the unit 16. The relays in the badge storage unit 16 control conventional relay contact decoding "trees" which translate the coded perforations into a conditioned digit representing paths. The decoding "trees" are connected in common to the interposer solenoids in the perforator 12 over a cable 50. Thus, the badge storage unit 16 provides a plurality of prepared paths equal in number to the number of digits in the sensed designation. These conditioned paths are subsequently completed in sequence under the control of the circuit 24 to operate the perforator 12.

The manual data control unit 18 provides for the storage of fixed items of information which are to be entered in common on a plurality of inventory records by the perforator 12 and may include a manually operable keyboard for entering additional items of information individual to each of the inventory record cards during the sensing of each tag by the unit 20. To provide the storage of fixed items of information, the manual data control unit 18 preferably includes a plurality of manually adjustable switches, the output contacts of which are connected to the interposer solenoids in the perforator 12 over a cable 52, as described in detail in the above identified copending Parsons and Harwood application. Further, to provide for the manually controlled entry of variable items of information, the unit 18 preferably includes a keyboard and control arrangement which is connected to the interposer solenoids in the perforator 12, as described in detail in the above identified copending Parsons and Harwood application.

Referring now to the tag sensing unit 20, this unit is adapted to removably receive an inserted perforated tag and is actuated under the control of the circuit 24 to selectively operate the tag storage unit 22 in accordance with the items of information derived from the sensed tag. The tags can be of any suitable type such as those formed by the tag making apparatus shown and described in the copending application of Floyd E. Harwood, Serial No. 708,199, filed January 10, 1958, which application is assigned to the same assignee as the present application. The tag sensing unit 20 is of a small, lightweight construction which permits it to be easily manipulated so that it can be freely moved within the area in which the inventory recorder unit 10 is disposed. This permits the perforated tags affixed to the articles to be inserted in the unit without removing them from the articles. To accomplish this, the tag sensing unit 20 is connected to the inventory recorder unit 10 by a composite cable including a first group of conductors or cable 27, which interconnects the tag sensing unit 20 with the tag storage unit 22, and a second group of conductors or cable 28 which interconnects the tag sensing unit 20 with the control circuit 24. The construction of the tag sensing unit 20 is identical to that of the badge sensing unit 14 which is described in detail in the above identified copending Parsons and Harwood application. As illustrated therein, the tag sensing unit 20 includes a plurality of movably mounted sensing pins which are adapted to be moved into engagement with an inserted perforated member, such as a tag, under the control of a solenoid 30, the selective energization of which is controlled by the circuit 24. The tag sensing unit 20 also includes a pair of normally open contacts 32 which are closed in response to the insertion of a tag into the unit 20.

Referring now to the tag storage unit 22, this unit is identical to the badge storage unit 16 which, as indicated above, is disclosed and described in detail in the above identified copending Parsons and Harwood application. This unit preferably comprises a plurality of groups of storage relays which are selectively operated by the tag sensing unit 20 to store the digits of information pertaining to the cost and designation of the articles derived from the tag sensed by the unit 20. The plurality of storage or decoding relays control a conventional relay contact "tree" which prepares a plurality of marking paths extending over a cable 34 to the interposer solenoids in the perforator 12. Thus, the selective operation of the tag storage unit 22 by the tag sensing unit 20 stores a plurality of variable digits in the unit 22 in the form of a number of prepared paths extending in common to the interposer solenoids in the perforator 12.

Referring now to the control circuit 24, this circuit functionally correlates the operation of the various components of the inventory recorder unit 10. In general, the circuit 24, following the storage of the fixed data items and in response to the storage of the article information in the unit 22, sequentially renders the common interposer solenoids in the perforator or recorder assembly 12 responsive in sequence to each of the digits of information stored in the units 16, 18 and 22 so that these items of information are recorded on an inventory record card in longitudinally spaced positions. At the completion of the recording of all of the items pertaining to a single inventoried article, the ejecting mechanism in the recording assembly 12 is actuated to discharge the punched card, the card magazine and feeding assembly 26 is operated to advance a blank card into the perforator 12, and the tag storage unit 22 is cleared to condition it for storing the items of information pertaining to the next article. In its basic arrangement, the control circuit 24 is identical to the control circuit described in detail in the earlier filed one of the two copending Harwood applications identified above. Thus, the illustrated components in the circuit 24 which are identical to components in the similar circuit in the earlier filed copending Harwood application are indicated by identical reference numerals followed by the suffix "X." The operation of the control circuit 24 is identical to the control circuit in the earlier filed copending Harwood application, except as modified by the description herein.

To initiate the operation of the inventory recorder unit 10, this unit is placed in the area in which the inventory is to be taken and a switch 58 is manually closed to complete an operating circuit for a relay 286X which extends to the positive potential supplied by a power supply unit 284X. The operation of the relay 286X closes a pair of contacts 286aX, among others. The closure of these contacts forwards the positive potential from the power supply 284X to the badge storage unit 16 to provide a source of holding potential for the relays in this unit. In the normal condition of the control circuit 24, a relay 64 is held in an operated condition by the positive potential supplied through a pair of normally closed contacts 306cX from the power supply 284X. The relay 64, in operating, closes a plurality of contacts 64a and 64b. The closure of the contacts 64a extends the positive potential supplied by the power supply 284X over a conductor 68 to holding circuits associated with the storage relays in the unit 20. Thus, when these relays are operated by the tag sensing unit 20, they are maintained operated over a holding circuit extending to the control circuit 24. The closure of the contacts 64b prepares a holding circuit for a relay 60.

In order to provide the fixed item of information representing the identity of the parties taking the inventory, a badge or key containing a punched numerical designation is inserted into the unit 14. The insertion of the badge into the sensing unit 14 selectively operates the plurality of storage relays in the badge storage unit 16 so that a plurality of marking paths are prepared in accordance with the number of digits forming the employee designations. Thereafter, the adjustable switches in the manual data control unit 18 are adjusted to positions representing certain fixed items of information which are to be recorded on each of the inventory cards, such as the department or division in which the inventory is being taken and, perhaps, the date of the inventory.

In order to feed the first record card from the assembly 26 into the perforator 12 and into a perforating position therein, a switch (not shown) is actuated which operates the assembly 26 to feed a card into a card receiving guideway in the perforator 12. The insertion of the card into this guideway actuates another switch (not shown) so that, as described in detail in the above identified, earlier filed Harwood application, the first card feeding drive assembly is rendered effective to advance the card through the guideway to a position in which the leading edge of the card is in a position to receive the first item of information. The completion of these conditioning operations is signified by the closure of a pair of contacts 288bX. At this time, the inventory recorder unit 10 is conditioned for operation in response to the insertion of the first tag into the sensing unit 20.

When the first article is to be inventoried, the portable tag sensing unit 20 is moved immediately adjacent the article and the perforated tag is inserted into the unit 20 so that the leading edge thereof engages one of the springs in the pair of contacts 32, thereby closing these contacts. The closure of the contacts 32 forwards the positive potential provided by the power supply 284X over a conductor 36 in the cable 28 through the closed contacts 32 to a conductor 38. The conductor 38 is connected directly to the operating winding of a slow-to-operate relay 60 and, through a pair of normally closed contacts 60c, to the operating winding of a slow-to-release relay 66. Accordingly, the positive potential supplied to the conductor 38 operates the relay 66 to close a pair of contacts 66a. The closure of the contacts 66a forwards the positive potential provided by the power supply 284X to a conductor 40 which extends through the cable 28 to the operating winding of the solenoid 30.

The energization of the winding of the solenoid 30 operates this solenoid to move the sensing pins in the unit 20 into engagement with the tag inserted therein. Certain of the sensing pins pass through apertures provided in the tag to operate a corresponding pair of contacts which are connected by the cable 27 to the operating windings of the storage relays in the tag storage unit 22. When these relays are selectively operated, they are maintained operated over a holding circuit extending to the positive potential supplied at the closed contacts 64a. Thus, the variable items of information, including the cost and designation of the inventoried article, derived from the tag sensed by the unit 20 are stored in the tag storage unit 22.

After the slow-to-operate interval of the relay 60, this relay operates to close a plurality of contacts 60a and 60b and to open the contacts 60c. The closure of the contacts 60a completes a holding circuit for the relay 60 extending to the positive potential provided by the power supply 284X through the closed contacts 64b. The opening of the contacts 60c interrupts the operating circuit for the slow-to-release relay 66 so that, after the slow-to-release interval thereof, this relay releases to open the contacts 66a. The opening of the contacts 66a removes the positive potential supplied to the operating winding of the solenoid 30 so that this solenoid releases to retract the sensing pins from the inserted tag, thereby permitting the sensed tag to be withdrawn from the unit 20. The inventory recorder unit 10 is now in condition to record the items of information pertaining to the first article.

More specifically, the closure of the contacts 60b in conjunction with the prior closure of the contacts 288bX completes an obvious operating circuit for a relay 302X. The operation of this relay, as described in the above identified, earlier filed Harwood application, engages a one revolution clutch which drives a control shaft from which are driven the step-by-step means for advancing the record card in the perforator 12, a means for operating the punching assembly under the control of the plurality of interposer solenoids, and a mechanism for driving a commutator 202X in synchronism with the operation of the punching assembly and the step-by-step card feeding mechanism. This rotation of the control shaft also rotates a cam 200X so that a pair of contacts 200aX are closed for a predetermined period in response to each cycle of revolution of the control shaft. The commutator 202X includes a common conductive segment 212X, a plurality of individual contacts 206X, and a pair of electrically connected wipers 208X and 210X which cooperate with the contacts 206X and the common segment 212X, respectively.

Thus, when the cam 200X first closes the contacts 200aX, the positive potential supplied through the closed contacts 288bX and 60b is forwarded through the contacts 200aX, the common conductive segment 212X, and the wipers 210X and 208X to the first of the individual contacts 206X. This contact is connected through a cable 42 to the relay contact decoding "tree" in the unit 16 controlled by the relays in which is stored the first digit of the employee designation. The positive potential forwarded over the cable 42 operates a selected one of the ten interposer solenoids in the recording assembly or perforator 12 to condition the perforator 12 for recording this digit as the first item of information on the card. During the continuing rotation of the control shaft, the punching assembly is operated to actuate the punch selected by the first group of storage relays in the badge storage unit 16, the card is advanced a single step, the cam 200X is advanced to open the contacts 200aX, and the wipers 208X and 210X are advanced a single step to the second position of the commutator 202X.

During the next cycle of rotation of the control shaft, the second digit stored in the unit 16 is recorded by the perforator 12 and the card is advanced a step to the position in which it is to receive the third item of information to be recorded thereon. In this manner, the step-by-step operation of the commutator 202X records the fixed items of information stored in the badge storage unit 16. Thereafter, continuing advancement of the commutator 202X records the information stored in the tag storage unit 22 by forwarding the positive potential over the conductor in a cable 44 to sequentially energize the various relay contact decoding "trees" controlled by the storage relays in the unit 22. Following the recording of this information, the step-by-step advancement of the commutator 202X sequentially extends the positive potential over the conductor forming a cable 46 to energize the control paths established in the manual data control unit 18, thereby to record this information.

Following the recording of all of the items of information pertaining to the first article, the wipers 208X and 210X move to their last stepping position in which the common conductive segment 212X is interconnected with the operating winding of an end-of-record relay 306X. Thus, when the cam 200X next closes the contacts 200aX, the relay 306X is operated to open the contacts 306cX, among others. The operation of the relay 306X also operates means to eject the perforated card from the perforator 212 and to operate the card magazine and feeding assembly 26 so that a blank card is fed into the card receiving guideway in the perforator 12. The opening of the contacts 306cX interrupts the operating circuit for the relay 64 so that this relay releases to open the contacts 64a and 64b. The opening of the contacts 64b interrupts the holding circuit for the relay 60 so that this relay releases to open the contacts 60a and 60b and to close the contacts 60c. The closure of the contacts 60c prepares the above described operating circuit for the relay 66. The opening of the contacts 60b interrupts the above described operating circuit for the relay 302X so that the clutch solenoid is released to prevent continuing rotation of the control shaft, thus preventing additional operation of the punching assembly, the step-by-step card feeding means, and the step-by-step advancement of the commutator 202X. However, during the last cycle of rotation of the control shaft, the wipers 208X and 210X are restored to their normal positions in which the common conductive segment 212X is connected to the contacts 206X forming the first stepping position of the commutator 202X. The opening of the contacts 60a interrupts an additional point in the interrupted holding circuit for the relay 60.

Referring back to the above described release of the relay 64, the opening of the contacts 64a removes the holding potential forwarded over the conductor 68 to the tag storage unit 22. Accordingly, the relays previously operated under the control of the tag sensing unit 20 are released to clear the stored digital information from the unit 22 and thus to condition this unit for receiving the items of information to be derived from the next tag sensed by the unit 20.

When the relay 306X is released by the opening of the contacts 200aX during the last cycle of rotation of the control shaft, the contacts 306cX are closed, among others, to again operate the relay 64. In operating, this relay closes the contacts 64a and 64b. The closure of the contacts 64a forwards the holding potential over the conductor 68 to the tag storage unit 22, and the closure of the contacts 60b again prepares a holding circuit for the relay 60.

The inventory recording unit 10 automatically operates, as described in detail above, in response to each insertion of a tag into the tag sensing unit 20 and thus the perforator 12 provides a plurality of inventory record cards each containing the variable items of information derived from the sensed tag and the fixed items of information stored in the manual data control unit 18 and the badge storage unit 16. Obviously, the items of information provided by the unit 18 and by the badge storage unit 16 can be changed at any time merely by readjusting the manual switches in the unit 18 or by opening the switch 58 to clear the storage unit 16 and then reinserting a badge into the unit 14 containing the desired information. Accordingly, the inventory recorder unit 10 of the present invention provides automatically operated means controlled by the insertion of a perforated tag into the portable sensing unit 20 for providing individual records including not only the variable items of information derived from a sensed tag but also certain fixed items of information which are stored in the units 16 and 18. By the automatic provision of these records by means which are controlled only by the insertion of a tag into a portable sensing unit, the time and cost of taking an inventory is materially reduced. Further, this recorder unit obviates the errors inherent in manually transcribing information.

Although the present invention has been described in conjunction with a single embodiment thereof, it is obvious that numerous other embodiments may be devised by those skilled in the art which will fall within the spirit and scope of the principles of this invention.

What is claimed as new and is desired to be secured by Letters Patent of the United States is:

1. An inventory unit for use with tags bearing data representing indicia comprising a recorder using a record medium, first data storing means for storing a plurality of fixed items of information, second data storing means for storing variable items of information, portable sensing means remote from said recorder and connected to said second data storing means, said sensing means being adapted to removably receive one of said tags, means responsive to the insertion of a tag into said sensing means for operating said sensing means to sense the indicia on the inserted tag and to store the data represented by the sensed data in said second data storing means, switching means controlled by the storage of data in said second data storing means for connecting said recorder to said first and second data storing means in sequence so that said recorder records the data from the sensed tag in conjunction with the fixed items of information, means for clearing said second data storing means, means for advancing said record medium, and means controlled by said switching means for operating said clearing means and said record medium advancing means following the recording of the items of information stored in said first and second data storing means.

2. An inventory unit for use with tags bearing data representing indicia comprising a recorder, first data storing means for storing a plurality of fixed items of information, first sensing means connected to said first data storing means for operating said first data storing means to store said fixed items of information, second data storing means for storing variable items of information, portable record sensing means remote from said recorder and connected to said second data storing means, said second sensing means being adapted to removably receive one of said tags, means responsive to the insertion of a tag into said second sensing means for operating said second sensing means to sense the indicia on the inserted tag and to store the data represented by the sensed data in said second data storing means, control means controlled by the storage of data in said second data storing means for connecting said recorder to said first and second data storing means so that said recorder records the data from the sensed tag in conjunction with the fixed items of information, and means controlled by said control means for clearing only said second data storing means following the recording of said items of information.

3. An inventory unit for use with tags bearing data representing indicia comprising a recorder including medium advancing means, first data storing means for storing a plurality of fixed items of information, first sensing means connected to said first data storing means for operating said first data storing means to store said fixed items of information, second data storing means for storing variable items of information, portable record sensing means remote from said recorder and connected to said second data storing means, said second sensing means being adapted to removably receive one of said tags, means responsive to the insertion of a tag into said second sensing means for operating said second sensing means to sense the indicia on the inserted tag and to store the data represented by the sensed data in said second data storing means, first control means for releasing said second sensing means with the previously sensed data stored in said second data storage means, second control means controlled by the storage of said data in said second data storing means for connecting said recorder to said first and second data storing means so that said recorder records the data from the sensed tag in conjunction with the fixed items of information, and third control means controlled by said second control means for operating said medium advancing means and for clearing only said second data storing means following the recording of said items of information.

References Cited in the file of this patent

UNITED STATES PATENTS

| | | |
|---|---|---|
| 2,338,180 | Harrison | Jan. 4, 1944 |
| 2,830,759 | Hudes | Apr. 15, 1958 |
| 2,878,872 | Burns et al. | Mar. 24, 1959 |
| 2,905,930 | Golden | Sept. 22, 1959 |